Figure 1:
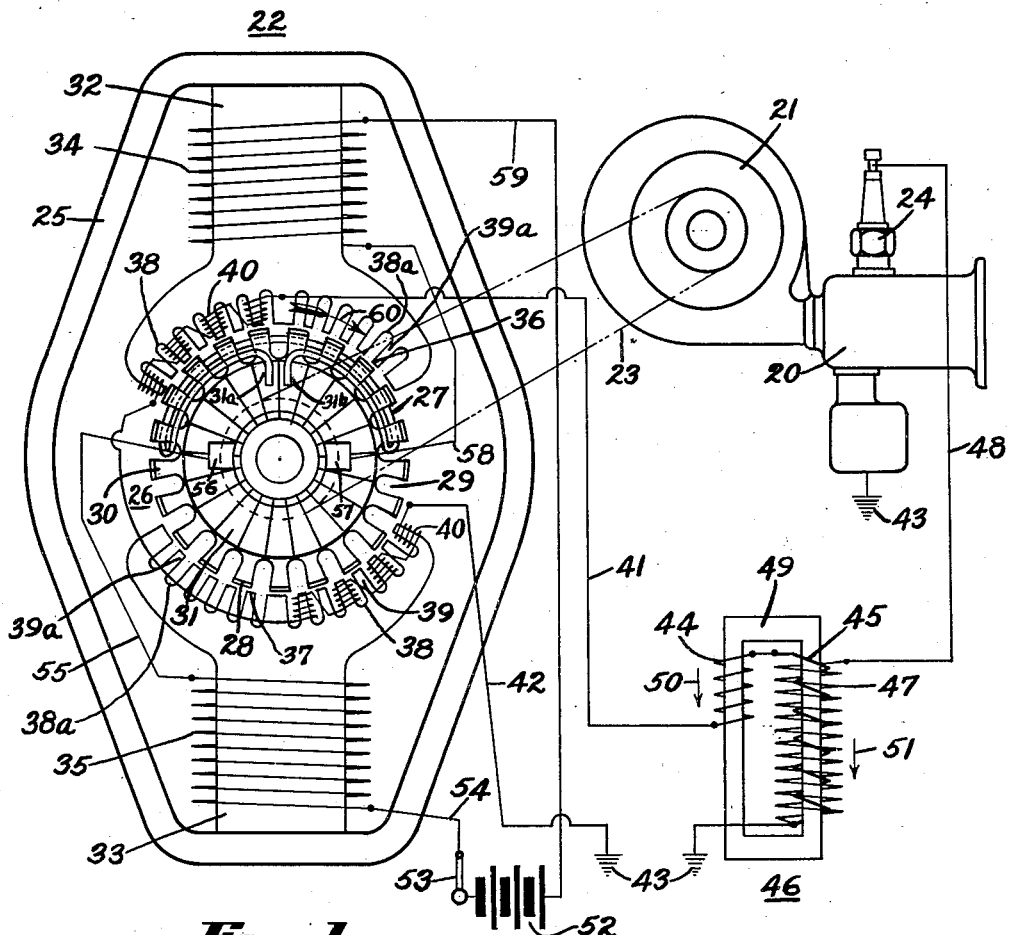

July 15, 1924.

J. H. HUNT 1,501,488

MOTOR AND IGNITION GENERATOR

Filed June 16, 1921

Witnesses
Irvin A. Greenwald
Geo. E. Pasco.

Inventor
John H. Hunt
Forrest B. MacNab
Attorney

By

Patented July 15, 1924.

1,501,488

UNITED STATES PATENT OFFICE.

JOHN H. HUNT, OF DAYTON, OHIO, ASSIGNOR TO THE DAYTON ENGINEERING LABORATORIES COMPANY, OF DAYTON, OHIO, A CORPORATION OF OHIO.

MOTOR AND IGNITION GENERATOR.

Application filed June 16, 1921. Serial No. 478,142.

*To all whom it may concern:*

Be it known that I, JOHN H. HUNT, a citizen of the United States of America, residing at Dayton, county of Montgomery, State of Ohio, have invented certain new and useful Improvements in Motor and Ignition Generators, of which the following is a full, clear, and exact description.

This invention relates to electrical ignition apparatus for electric motor driven liquid fuel burners, for example, that type of liquid fuel burner described in my copending application Serial No. 285,662, filed March 27, 1919. In this application there is disclosed a liquid fuel burner to which air is supplied from a blower under pressure for the purpose of atomizing the fuel within the burner and for supplying a blast of air for combustion purposes. This fuel spray is ignited by spark from a spark plug having its electrodes located within the burner. The blower is driven by an electric motor.

It is an object of the present invention to provide electrical ignition at the spark plug without requiring a source of current in addition to the current for operating the motor and without requiring any make and break apparatus. In carrying out this object of the invention it is a further object to provide the electric motor with high frequency windings which are most advantageously placed upon the faces of the field poles of the motor and to provide for cooperation with these high frequency windings a high frequency induction coil or transformer which is connected also with the spark plug of the burner.

Other and further objects of the present invention will be apparent from the following description, reference being had to the accompanying drawings, wherein preferred embodiments of the present invention are clearly shown.

Figure 2:
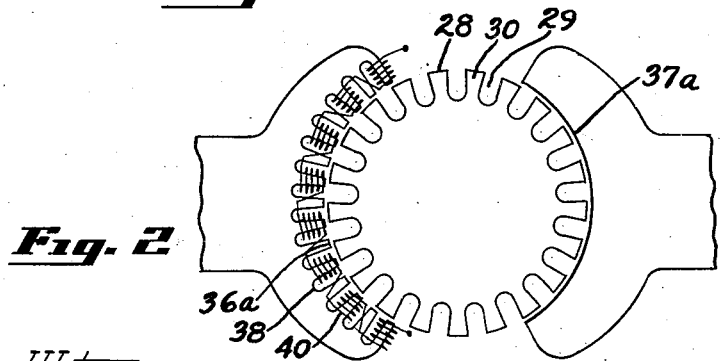

In the drawings:

Fig. 1 is a wiring diagram of an electric motor and a high frequency induction coil included in the present invention together with a diagrammatic side view of a burner with which the invention is to be used; and Fig. 2 is a fragmentary diagrammatic view of the motor showing a modified arrangement of the high frequency windings.

In the drawings, 20 designates a liquid fuel burner to which air under pressure is supplied from a blower 21. Blower 21 is driven by motor 22 in any suitable manner such as by direct connection or by means of a belt illustrated diagrammatically by the dot and dash line 23. Burner 20 is provided with spark plug 24, the electrodes of which are located so as to ignite the fuel spray within the burner. As the particular construction of the burner does not constitute a part of the present invention, it is thought that further description of the burner is unnecessary. The motor 22 includes a frame 25 supporting for rotation an armature 26 including windings, one of which is shown at 27 and a core 28 provided with open slots 29 to provide spaced teeth 30. The commutator 31 includes preferably as many segments as there are slots 29 and each of the conductors 27 is connected preferably in the same manner that the conductor 27, shown in Fig. 1, is connected with segments 31ª and 31ᵇ. For example, the conductor 27 which is next adjacent to the one shown in Fig. 1 of the drawings, that is next in the direction of the arrow 60, will have one of its terminals connected to the segment 31ᵇ and the other of its terminals connected to the segment just to the right of the segment 31ᵇ. The frame 25 supports field poles 32 and 33 supporting field windings 34 and 35, respectively. The poles 32 and 33 are provided with pole shoes or faces 36 and 37 respectively, the leading portions of which are provided with slots 38 to form spaced leading pole-face teeth 39. The pitch of the leading pole-face teeth 39 is preferably one-half the pitch of the armature core teeth 30. Alternate leading pole-face teeth 39 are each provided with a pole-face winding 40 and all of the windings 40 are connected in series, by means of wires 41 and 42 and ground connections 43, with an inductive regulating circuit 44 and with the primary winding 45 of an ignition coil or high frequency transformer coil designated as a whole by the numeral 46. This coil includes also a secondary winding 47 grounded at 43 and connected by wire 48 with the spark plug 24 which is grounded on the burner 20 having a connection with ground 43. The coil 46 includes also a closed magnetic core 49 one leg of which is surrounded by the regulating inductive circuit 44. This circuit is wound differentially with respect to the primary winding 45 so that as the speed of the motor varies to increase the frequency and voltage of the primary ignition circuit, the quantity of ignition produced at the spark plug 24 will be maintained practically constant in value. This differential relation between windings 44 and 45 is indicated diagrammatically by means of arrows 50 and 51. This regulator in combination with the present invention is the joint invention of J. T. Fitzsimmons and myself and is described and claimed in copending application Serial No. 485,356, filed July 16, 1921.

The battery 52 is connected by means of a switch 53 with wire 54 leading to field winding 35 which is connected by wire 55 with motor brush 56 engaging with commutator 31. The other motor brush 57 is connected by wire 58 with the motor field winding 34 which is connected by wire 59 completing the circuit to the battery 52. The connections are such as to produce rotation of the motor armature 26 in the direction of the arrow 60, when the switch 53 is closed as shown in Fig. 1. The motor then will drive the blower 21 to furnish the burner 20 with a spray of fuel and air for combustion thereof. As the armature core teeth 30 rotate past the pole-face teeth 39, a high frequency current will be generated in the pole-face windings 40 and this current will be transformed in the transformer ignition coil 46 to produce sparking at the spark plug 24.

The production of the high frequency current in the pole-face windings is believed to be due to the rapid growth and diminution of the magnetic flux in the pole teeth as the armature teeth pass by.

I have found that if the entire pole-face area is provided with a series of slots there is a great tendency for the motor armature to lock in position requiring a large amount of current to start it. I may overcome this to some extent by providing slots over the entire pole-face area of one of the pole faces as shown at 36$^a$ in Fig. 2, leaving the other pole face 37$^a$ smooth. In this manner the amount of starting current may be reduced.

I have found that I can obtain even better results by slotting the leading portion of each pole face and by dividing the pole-face windings between the leading portions of the pole faces as shown in Fig. 1. The locking effect is reduced and the windings 40 are more advantageously located because, due to armature reaction, the field flux is crowded in the direction of the leading portions of the motor pole faces.

The locking effect may be still further reduced by slotting the trailing portions of both pole faces by slots 38$^a$ to form teeth 39$^a$ which are out of phase with teeth 39 by the angular distance of one-half the spacing between teeth 39. The spacing of teeth 39$^a$ is the same as teeth 39. No windings are located in slots 38$^a$. By test I have found that the amount of current required to break the armature away from the field in the case of the motor shown in Fig. 1, is about one-half the amount required in case of a motor constructed in accordance with Fig. 2.

While the forms of mechanisms herein shown and described constitute preferred forms of embodiments of the invention, it is to be understood that other forms might be adopted, all coming within the scope of the claims which follow.

What I claim is as follows:—

1. In a motor and high frequency generator, the combination with field poles and an armature including windings and an open-slotted core; of a series of pole-face windings distributed over a portion only of the total pole-face area of the field poles, said windings being independent of the armature windings.

2. In a motor and high frequency generator, the combination with field poles and an armature including windings and an open-slotted core; of a series of pole-face windings distributed over the leading portions only of the faces of the field poles, said windings being independent of the armature windings.

3. In a motor and high frequency generator, the combination with an armature having windings and an open-slotted core; of poles having their leading pole-face portions open-slotted and their trailing pole-face portions open-slotted, the slots of the trailing portions being out of phase with the slots of the leading portions; and pole-face windings located in the slots of the leading portions of the pole faces.

4. In a motor and high frequency generator, the combination with an armature having windings and an open-slotted core; of poles having their leading pole-face portions open-slotted and their trailing pole-face portions open-slotted, the slots of the trailing portions being out of phase with the slots of the leading portions by an amount equal to one-half the slot spacing; and pole-face windings located in the slots of the leading portions of the pole faces.

In testimony whereof I hereto affix my signature.

JOHN H. HUNT.

Witnesses:
WALTER W. RIEDEL,
IRVIN A. GREENWALD.